United States Patent
Gross et al.

(10) Patent No.: US 7,162,312 B2
(45) Date of Patent: Jan. 9, 2007

(54) METHOD, SYSTEM AND DEVICE FOR PREDICTIVE ERROR RECOGNITION IN A PLANT

(75) Inventors: Wolfgang Gross, Erlangen (DE); Christian Schuderer, Neunkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 321 days.

(21) Appl. No.: 10/724,808

(22) Filed: Dec. 1, 2003

(65) Prior Publication Data
US 2005/0066241 A1  Mar. 24, 2005

Related U.S. Application Data

(60) Provisional application No. 60/505,699, filed on Sep. 24, 2003.

(51) Int. Cl.
*G05B 9/02* (2006.01)
*G06F 11/30* (2006.01)

(52) U.S. Cl. ........................................ 700/79; 702/182
(58) Field of Classification Search .................. 700/79, 700/80, 110, 143, 28, 29, 21; 702/182, 183, 702/185
See application file for complete search history.

(56) References Cited

U.S. PATENT DOCUMENTS

| 5,311,562 | A | 5/1994 | Palusamy et al. | |
| 6,122,575 | A * | 9/2000 | Schmidt et al. | 701/29 |
| 6,205,419 | B1 * | 3/2001 | Fiedler | 704/201 |
| 6,487,404 | B1 | 11/2002 | Kransmo et al. | |
| 6,636,842 | B1 * | 10/2003 | Zambrano et al. | 706/23 |
| 2002/0077792 | A1 * | 6/2002 | Qiu | 703/2 |
| 2003/0204777 | A1 * | 10/2003 | Kojori | 714/14 |
| 2003/0225466 | A1 * | 12/2003 | Yulevitch et al. | 700/80 |

FOREIGN PATENT DOCUMENTS

| DE | 199 59 526 A 1 | 6/2001 |
| DE | 101 14 211 A 1 | 11/2001 |
| DE | 101 61 633 A 1 | 8/2002 |
| DE | 101 61 655 A 1 | 1/2003 |
| EP | 0 722 579 B1 | 3/1998 |
| JP | 10255091 A * | 9/1998 |

* cited by examiner

*Primary Examiner*—Thomas Pham

(57) ABSTRACT

Method, system and device for predictive recognition of errors in a manufacturing system, said comprising: online monitoring of data of the manufacturing system; and online comparing said data with archived error patterns to predict errors supposed to occur in the manufacturing system; whereby the archived error patterns are built and recognized by statistical methods and data mining methods. The present invention can be used for discrete or continuous or batch processes.

18 Claims, 7 Drawing Sheets

METHOD, SYSTEM AND DEVICE FOR PREDICTIVE ERROR RECOGNITION IN A PLANT

CROSS REFERENCE TO RELATED APPLICATIONS

This application claims the benefits of the provisional U.S. application 60/505,699 filed Sep. 24, 2003.

FIELD OF THE INVENTION

The present invention relates in general to a method, a system and a device for predictive error recognition, and in particular to a method, a system and a device for predictive error recognition in manufacturing systems, such as plants.

BACKGROUND OF THE INVENTION

Production facilities, commonly referred to as plants, continue to increase in complexity due to automation and interconnections between sections of the plant, individual machines within the plant and interconnections between different layers of the "automation pyramid", among other reasons. Typically the "automation pyramid" is classified into the following layers: the ERP-layer (Enterprise Resource Planning), the MES-layer (Manufacturing Execution System) and the controls-layer. Coping with this increasing complexity is difficult for predictive error recognition corrective and precautionary maintenance activities. This affects the operator of the plant, the original equipment manufacturer (OEM), and the system and component supplier.

U.S. Pat. No. 6,487,404 discloses a system and method of detecting radio network trends in a telecommunications network using a data mining tool. But this invention does not disclose the usage of a data mining tool for predictive error recognition in manufacturing systems.

German patent application DE 199 59 526 A1 discloses a method for predictive error recognition in a vehicle.

Japanese patent JP 10255091 A discloses a system to perform predicted maintenance using statistical data.

US PAP 2001/0037363 A1 discloses another method for providing consulting services to resolve a problem in a centralized web-based environment.

U.S. Pat. No. 5,311,562 discloses an integrated information system for plants such as nuclear power generation plants for maintenance with predictive diagnostics. But this invention needs additional sensors to monitor the processes in the plant.

In the past two types of systems and methods have been established for predictive error recognition. On the first hand, systems and methods which use technological models, based on inherent plant data. These model based systems and methods have the following disadvantages: the models require additional engineering effort, the quality of a model based predictive error recognition depends on the quality of the transformation of the plant facts into the models and only errors which are thought ahead are able to be predicted.

On the other hand, systems and methods which use dedicated sensors for predictive statements can be used for predictive error recognition. This approach has the following disadvantages: also additional engineering efforts are necessary and in the plant is additional wiring necessary to mount and connect the sensors.

Therefore there is a need for a method and a system predictive error recognition which do not require additional engineering efforts and which do avoid additional hardware and wiring in the shop floor.

SUMMARY OF THE INVENTION

Up to now it is very expensive to supervise a complex plant environment entirely for predictive error recognition. Therefore only security relevant and expensive components of a plant are supervised by predictive error recognition mechanisms. Furthermore these mechanisms contain subjective knowledge of engineers or maintenance people and therefore the quality of the mechanisms depends these individuals.

One aspect of the present invention thus involves a method for predictive recognition of errors in a manufacturing system, said method comprising the steps of: archiving a plurality of error patterns that previously occurred in the manufacturing system, the archived error patterns created by statistical methods; monitoring manufacturing system data in real-time; and comparing the monitored data with the archived error patterns in real-time to predict imminent errors likely to occur in the manufacturing system.

Another aspect of the present invention involves a computerized system for predictive recognition of errors in a manufacturing system, comprising: a mechanism for archiving a plurality of error patterns that previously occurred in the manufacturing system, the archived error patterns created by statistical methods; a mechanism for monitoring manufacturing system data in real-time; and a mechanism for comparing the monitored data with the archived error patterns in real-time to predict imminent errors likely to occur in the manufacturing system.

Another aspect of the present invention involves a device for predictive recognition of errors in a manufacturing system, comprising: a mechanism for archiving a plurality of error patterns that previously occurred in the manufacturing system, the archived error patterns created by statistical methods; a mechanism for monitoring manufacturing system data in real-time; and a mechanism for comparing the monitored data with the archived error patterns in real-time to predict imminent errors likely to occur in the manufacturing system.

Further aspects, features and advantages of the present invention will become apparent from the drawings and detailed description of the following preferred embodiments.

BRIEF DESCRIPTION OF THE DRAWINGS

The above-mentioned and other concepts of the present invention will now be addressed with reference to the drawings of the preferred embodiments of the present invention. The shown embodiments are intended to illustrate, but not to limit the invention. The drawings contain the following figures, in which like numbers refer to like parts throughout the description and drawings and wherein.

DETAILED DESCRIPTION OF THE PREFERRED EMBODIMENT

Overview

Figure 1:
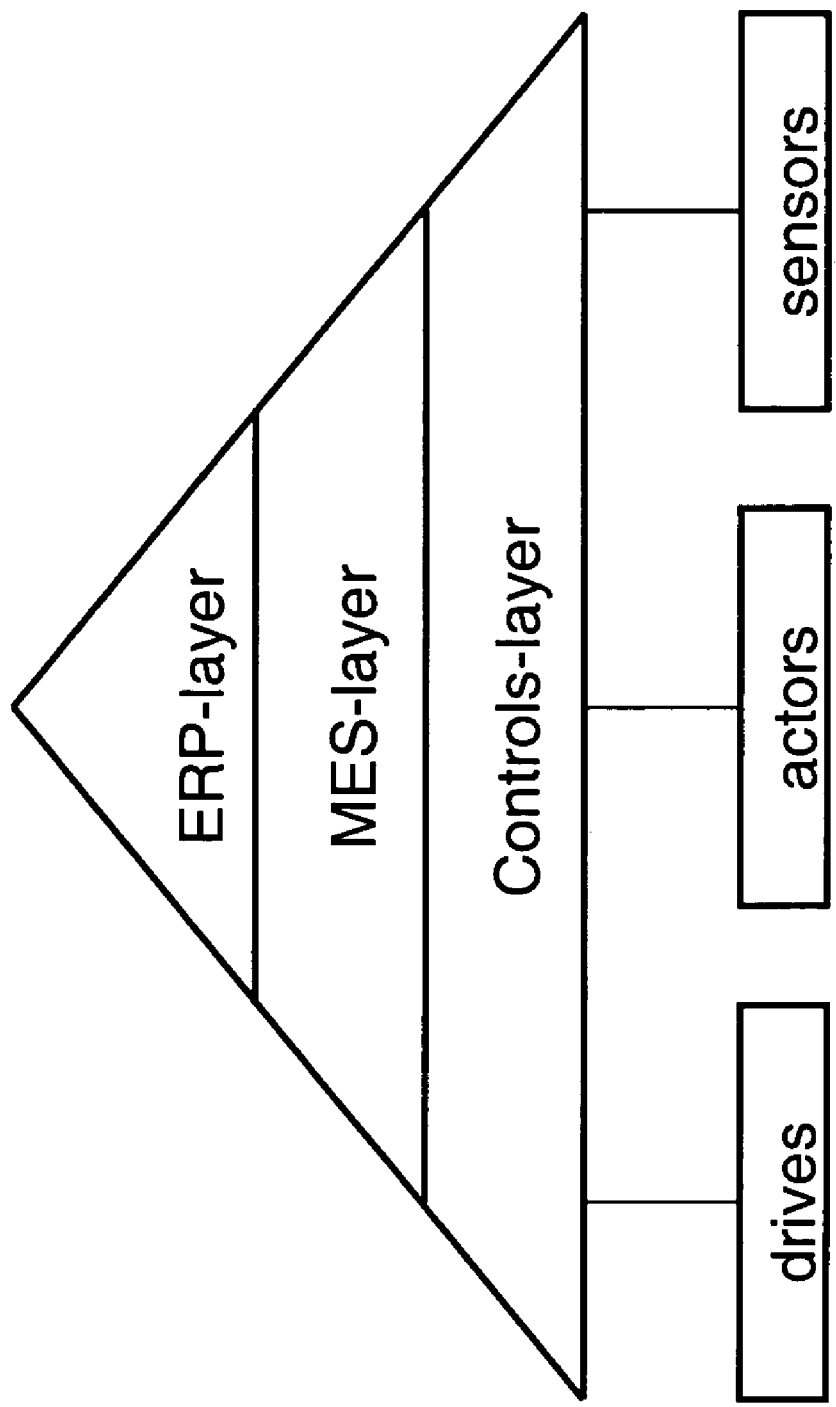
FIG. 1 shows a schematic diagram of the automation pyramid.

A concept of the invention involves the continuously collecting of data in a manufacturing system to get a sound base for a predictive recognition of errors. For example this data collection can be accomplished by online capturing and monitoring data coming from automation components or automation applications from all layers of the automation hierarchy (see FIG. 1). Advantageously the monitored data can be densified using statistical methods or data mining mechanisms to focus them and to reduce the amount of data. Structure information regarding the data based on the automation hierarchy or based on the topology of a plant (e.g. the break down in plant/line/cell/station) can also be used to reduce the amount of the monitored data. Furthermore a condensation of the monitored data can be achieved by functional containment to involved components or applications. The monitored data can be stored in a data base 2. This data base can be implemented as a ring buffer. The monitoring of the data of the manufacturing system can be accomplished in real-time. Real-time monitoring comprises monitoring in a couple of seconds or monitoring the data instantaneously. Furthermore real-time monitoring enables an online monitoring, which can be accomplished advantageously via the Internet.

An advantageously concept of the invention is that the monitored data can be readout of the interfaces of the automation components (automation devices, automation tools, PLC, etc.) automatically.

Another concept of the invention is mapping of an error situation in a dedicated error pattern. An error pattern represents an error occurred in a plant. This mapping can be supported by statistical methods.

Another advantageous concept of the invention is the learning and continuous improving of error patterns. If an error occurs, automatically an error pattern will be derived form the history of the error. The data arising in the run-up of the error (e.g. trends, changes, etc.) will be analyzed using statistical methods and data mining mechanisms to define a minimal but sufficient error pattern. The error pattern can be stored in the data base 2.

A further concept of the invention is the online and real-time comparison of the monitored data and the error patterns to find an error pattern which points out to an impending error. The monitored data will be online compared with archived error patterns to predict errors. If a potential error is predicted, maintenance measures can be initiated to avoid the error. This can avoid dead times of the plant or components. Furthermore damages of the products or components can be avoided. Based on a minimal amount of historical data derived from previous error the occurrence of the same or similar error can be predicted. Therefore the invention can be used for preventive maintenance. Real-time comparison comprises monitoring in a couple of seconds or comparison the data instantaneously. Furthermore real-time comparison enables an online comparison, which can be accomplished advantageously via the Internet.

Another advantageous concept of the invention is the continuous optimization of the error pattern. If an error erroneously predicted or an error was not recognized, the error pattern regarding these cases will be improved based on the actually monitored data.

Another concept of the invention is that error patterns can be imported and used for the error prediction. The imported error patterns can be imported from the internet or via computer readable media (e.g. floppy disc, CD).

Another concept of the invention is that error patterns or acquired knowledge regarding errors can be exported and sold to third parties. Interested third parties can be other plant operators, suppliers, system integrators, original equipment manufacturer (OEM) among others.

Another advantageous concept of the present invention is that the prediction of errors does not require additional sensors and appropriate wiring or engineering efforts to define dedicated models. To predict error the invention uses data which are present anyway.

A further advantageous concept of the present invention is that the error recognition and the monitoring, collecting and storing of the data can be accomplished central or decentral using components (e.g. hub, switch, bridges) which are parts of the network infrastructure of a plant.

Another advantageous concept of the present invention is the use of statistical methods and data mining mechanisms to analyze the monitored and captured data of plant components to recognize data patterns which indicate to immanent errors of the component. Advantageously the statistical methods and data mining mechanisms are implemented in one or more powerful and efficient computer systems (e.g. workstations, Personal Computer, automation component with powerful CPU). For example, data mining software uses a variety of approaches to sift and sort data identify data patterns and relevant process information (e.g. temperature or humidity in the plant). Typical data mining approaches are: decision-tree approach, rule discovery approach, neuronal network approach, genetic programming, fuzzy logic or nearest neighbor approach. These can be combined in different ways to sift and sort complex data. Commercial software packages often use a combination of two or more of these approaches.

Information regarding neuronal networks, computational intelligence, fuzzy logic et al. and principles to implement these methods can be found in "Computational Intelligence PC Tools" by Russ Eberhart et al., published by Morgan Kaufmann, September 1996 which is incorporated by reference herein in its entirety. Information regarding data mining can be found in "Data Warehousing and Data Mining for Telecommunications" by Rob Mattison, published by Artech House, August 1997 which is incorporated by reference herein in its entirety.

Those skilled in the art will readily understand the invention can be applied to plants, plant sections (e.g. test fields), plant components (e.g. assembly lines or production lines), plant units (e.g. pumps, squeezer, compressors or machines). Furthermore those skilled in the art will readily understand the invention can be used in production industries, manufacturing industries, continuous industries, process industries and batch processing industries.

FIG. 1 shows a schematic diagram of the automation pyramid, which can typically be found in production industries, manufacturing industries, continuous industries, process industries or batch processing industries. The pyramid-like form expresses that a densification of the information occurs form the bottom up to the top. The top layer is the ERP-layer (Enterprise Resource Planing). Tasks accomplished in the ERP-layer are company management functions, marketing, sales, finance, human resource management but also comprehensive logistic tasks such as order management or supply management.

The lowest layer of the automation pyramid is the controls layer. For example, Programmable Logical Controls (PLC), Motion Controls in connection with process visualization or process control systems are used on this automation layer. Field devices of the shop floor (actors, sensors, drives, etc.) are connected and controlled by components of the controls layer.

The link between the ERP-layer and the controls layer is formed by the MES-layer (Manufacturing Execution Systems). The applications of the MES-layer provide the vertical connection between the ERP-layer and the controls layer. Typical MES-applications are Production Management, Quality Management, Maintenance Management, Performance Analysis, Labour Management, and Asset Management, among others. For example, MES-applications transfer the gross plannings of ERP-systems to detained plannings for dedicated production systems or MES-applications prepare and condense data from the controls-layer for use in ERP-systems.

Typically ERP-systems, MES-systems and control systems have a runtime system for the sequence control of involved components (HW modules, SW modules, tasks, processes of the operating system etc.) and they comprise an engineering system to edit programs and plans.

The present invention can take into account data of all layers of the automation pyramid and of field devices.

An advantageous aspect of the invention is that the data taken into account to predict a potential occurrence of an error can be scaled. Therefore data form dedicated layers or combinations thereof can be taken into account (horizontal scaling), but also only sections of one or more layers can be taken into account (vertical scaling). For example, only the data regarding a special product, a special production process or a manufacturing area (part of a building, line cell, machine, . . . ) can be used to receive a focused or dedicated error prediction. This is advantageous e.g. for the introduction of a new production facility (machine, cell, line, machine, control, . . . ) to fast eliminate the troubles of the starting phase.

Figure 2:
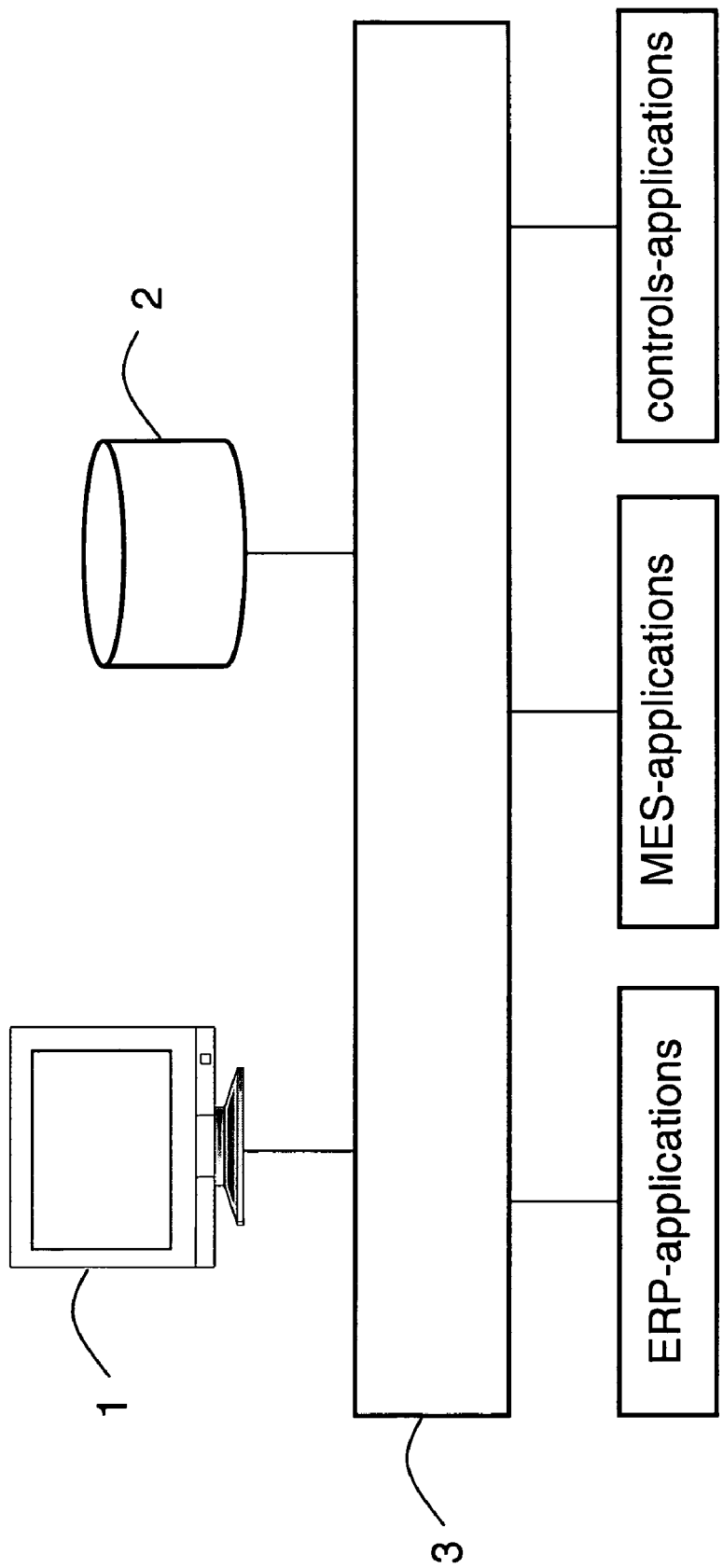
FIG. 2 is another schematic diagram showing exemplarily the integration of components of different layers of a manufacturing system.

FIG. 2 shows exemplarily the integration of components of different layers of a manufacturing system. For example, the applications of the different layers (ERP, MES, controls) can be integrated by the use of a framework 3. The framework 3 integrates the ERP-, MES- and controls-applications and also a user workstation 1 and also a data base 2. The workstation 1 typically comprises output devices (e.g. monitor, displays, printer), input devices (e.g. mouse, keyboard), processor and memory facilities. For example, the applications can be connected to the framework 3 via adapters or wrappers. The applications and the framework 3 can run on dedicated computers or processors, or they can run on the workstation 1. On the workstation 1 can also run the mechanism for online monitoring of data of the manufacturing system and the mechanism for online comparing the data coming from the components of the automation layers with archived error patterns to predict errors supposed to occur in the manufacturing system. Advantageously the comparison is performed by statistical methods. The archived error pattern can be stored in a data base 2 connected to the framework 3. Advantageously the data base 2 can be used as a ring buffer to store the monitored data.

Mechanisms like HTTP (Hypertext transfer protocol), DCOM (Distributed Component Object Model) or MSMQ (Microsoft Message Queue) can be used by the framework 3 to facilitate the communication and the data exchange between the applications and between the applications and the workstation 1 or the data base 2.

Normally manufacturing environment are heterogeneous because the automation components are provided by different suppliers or the components have different data models or the data are represented by different ways. But for a reliable error prediction in a manufacturing environment it is important that also heterogeneous components are taken into account. The framework 3 can be adopted to act as a middle ware platform or integration platform for the integration and communication of the applications and for delivering the monitored data to the workstation 1 to feed the inventive comparison mechanism.

Another advantageous aspect of the invention is that a client server architecture can be used to realize the invention. For example, the framework 3 and the workstation 1 with the mechanism for online comparison can be realized as a servers with the applications and the data base 2 as clients.

Figure 3:
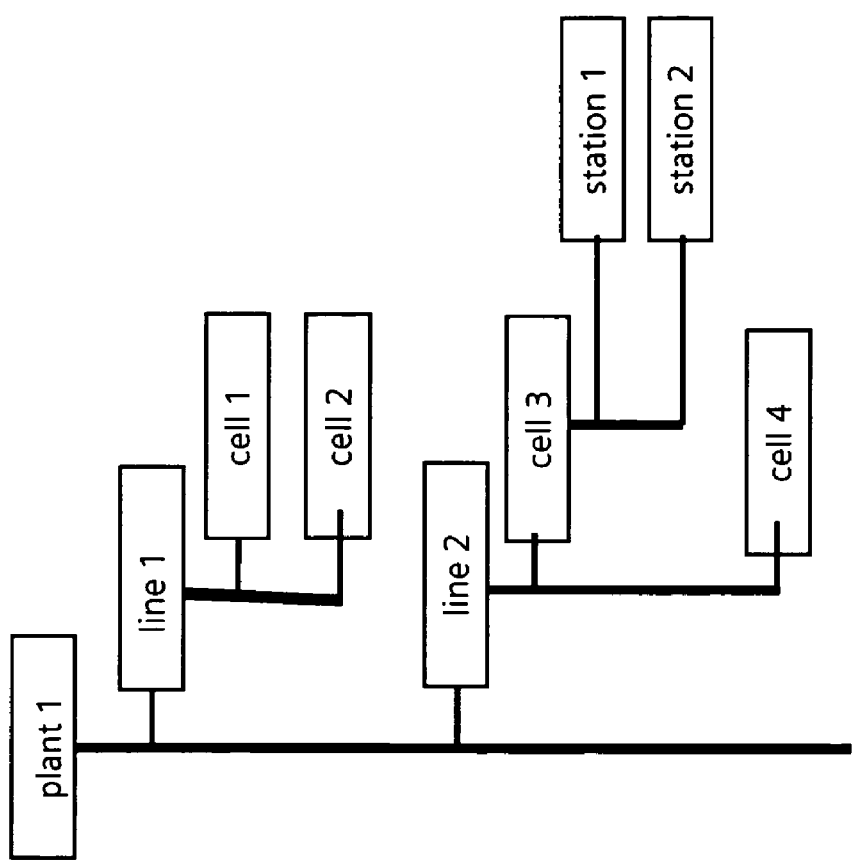
FIG. 3 shows an exemplary hierarchical structure of a plant.

FIG. 3 shows an exemplary hierarchical structure of a plant. A plant can broken down in lines, cells, stations (machines, components, etc.). The information which is incorporated in the hierarchical structure of a plant can be used to filter the monitored data or to density and reduce the amount of the monitored data. For example, redundancies can be easily recognized and eliminated. Furthermore an a real or functional containment can be performed using the hierarchical structure of a plant.

Figure 4:
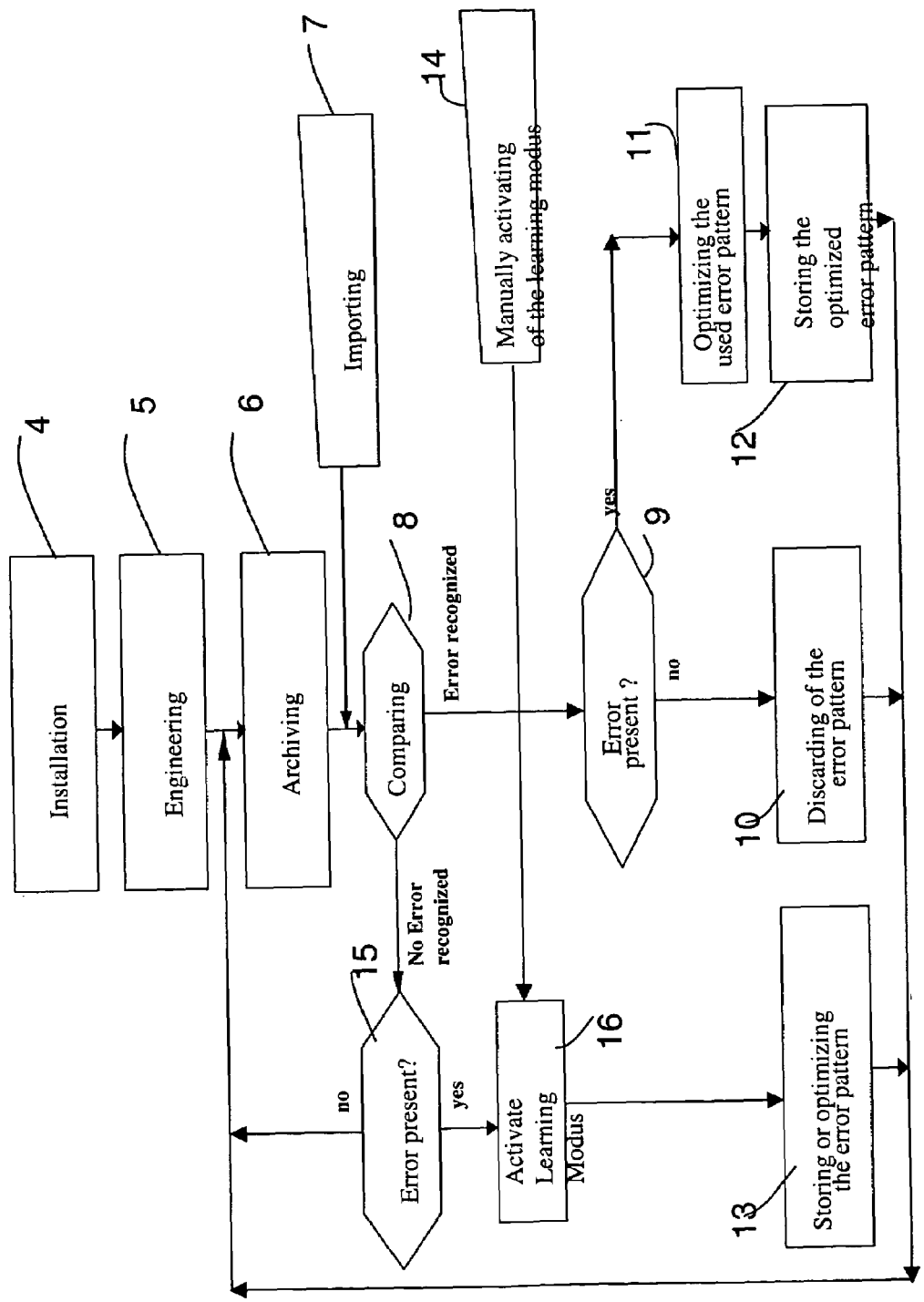
FIG. 4 shows a flowchart for an exemplary embodiment of the invention.

FIG. 4 shows a flowchart for an exemplary embodiment of the invention. The stage installation 4 comprises establishing the necessary communication connections to receive the data from the components or the applications and setting of parameters, for example the size of the ring buffer of the data base 2.

In the stage engineering 5 the data to be monitored and the communication connections to receive these data will be specified. To receive the data to be monitored a polling mechanism or a interrupt mechanism among others can be used. If there is a high frequency of data in a component or an application a polling mechanism can be used advantageously. If there is only a low frequency of data, it can be of advantage to use an interrupt mechanism to receive the data.

In the stage archiving 6 the monitored data are archived in the data base 2 and statistically analyzed to extract significant data pattern coming forward an error to easily and quickly recognize this data pattern in the future to predict the associate error. To reduce the amount of data to the most significant but sufficient one, also data mining mechanisms can be used. Extracted and defined error pattern are stored in the data base 2.

Comparing 8 comprises the recognition of stored error pattern, derived from an erroneous situation in the past, in the stream of the online monitored data to predict an impending error. The aim of the comparing stage 8 is to identify an impending error using a minimal set of legacy data (data forewent this error in the past) and actually monitored data. If no error will be recognized and there is really no error present (15; no-branch) there will be continued with the archiving of the monitored data 6. If no error will be recognized, but there is an error present (15; yes-branch) the learning modus will be activated 16. Activation of the learning modus means that the predictive system will be synchronized with an real error, to learn this error.

Learning an error means to capture and analyze the data coming with the error to derive an error pattern dedicated to this error. This derived error pattern can be used to recognize and predict this error in the future. The derived error pattern can be stored 13 in the data base 2. The derived error pattern can also be optimized 13. The optimization can be accomplished automatically using statistical methods or done manually (e.g. by maintenance personal). The learning modus 16 can also be activated manually 14 (e.g. by operating or maintenance staff). Synchronization especially comprises a time synchronization between the system and the erroneous parts of the plant.

The comparing 8 can also use error pattern imported 7 and acquired from third parties. For example, potential third parties can be OEM, suppliers or similar plants. The comparing can be accomplished by the central evaluation unit 17. It is also conceivable that the comparing will be accomplished by one or more decentral units (e.g. hub, switch, bridge). This is possible when the decentral units have sufficient processing power. This embodiment has the advantage that the workload can be distributed and another advantage is that the fault tolerance will be increased by this distributed embodiment of the invention.

If comparing 8 recognizes and predicts an error but there is no error present the used error pattern will be discarded 10. If comparing 8 recognizes and predicts an error and there is an error present the used error pattern will be optimized 11 and the optimized error pattern will be stored 12 (e.g. in the data base 2).

For example, statistical methods or data mining mechanisms can be used to optimize the error pattern. Optionally interested parties can be informed about the new error pattern (OEM, suppliers etc.). The new error pattern will be archived (e.g. in the data base 2).

To recognize and predict impending errors the present invention can also use neuronal nets or fuzzy logic methods.

Figure 5:
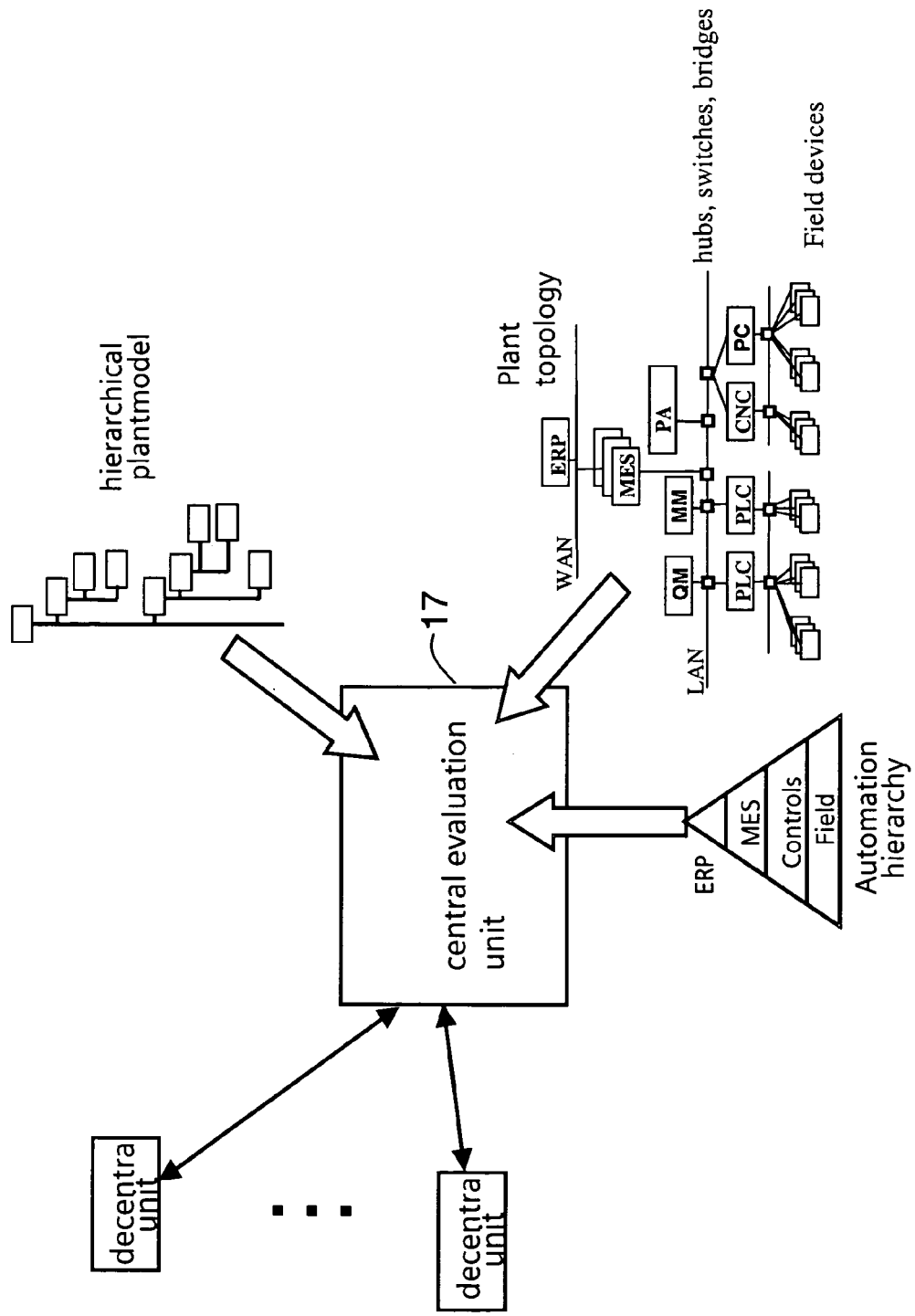
FIG. 5 shows an exemplary configuration of the present invention.

FIG. 5 shows an exemplary configuration of the present invention. FIG. 5 depicts an realization of the invention in a centralized manner. In order to predict errors a central evaluation is performed by an central evaluation unit 17 based on input data derived from the hierarchical plant model (e.g. functional relation ships of plant components), based on input data derived from the plant topology (e.g. on-site relationships of plant components), based on input data derived from the automation hierarchy (e.g. hierarchical relationships between PLCs and field devices or between ERP and MES-systems) or based on data from decentral units (e.g. history of errors, results of monitoring of defined conditions). The conditions (error pattern) to be monitored by the decentral units can be defined centrally and submitted to the decentral units. For example, decentral units in a plant can be peripheral devices (e.g. hub, switch, bridge). An advantage of the invention is that existing structurings (e.g. hierarchical plant model, plant topology, automation hierarchy) are used to reduce the amount of the data to be analyzed. This saves processing power, reduces the necessary memory and provides a fast prediction.

If the central evaluation unit 17 recognizes a potential error, the affected decentral component sends the history data of the error to the central evaluation unit 17. The central evaluation unit 17 is subordinate and decides whether an error is imminent or not and initiates the necessary measures (e.g. maintenance measures, switch off components or parts of the plant). The embodiment shown in FIG. 5 can be realized by a client server architecture. The central evaluation unit 17 can be easily implemented as an data and evaluation server, where the programs for data mining and statistical evaluations are implemented.

Figure 6:
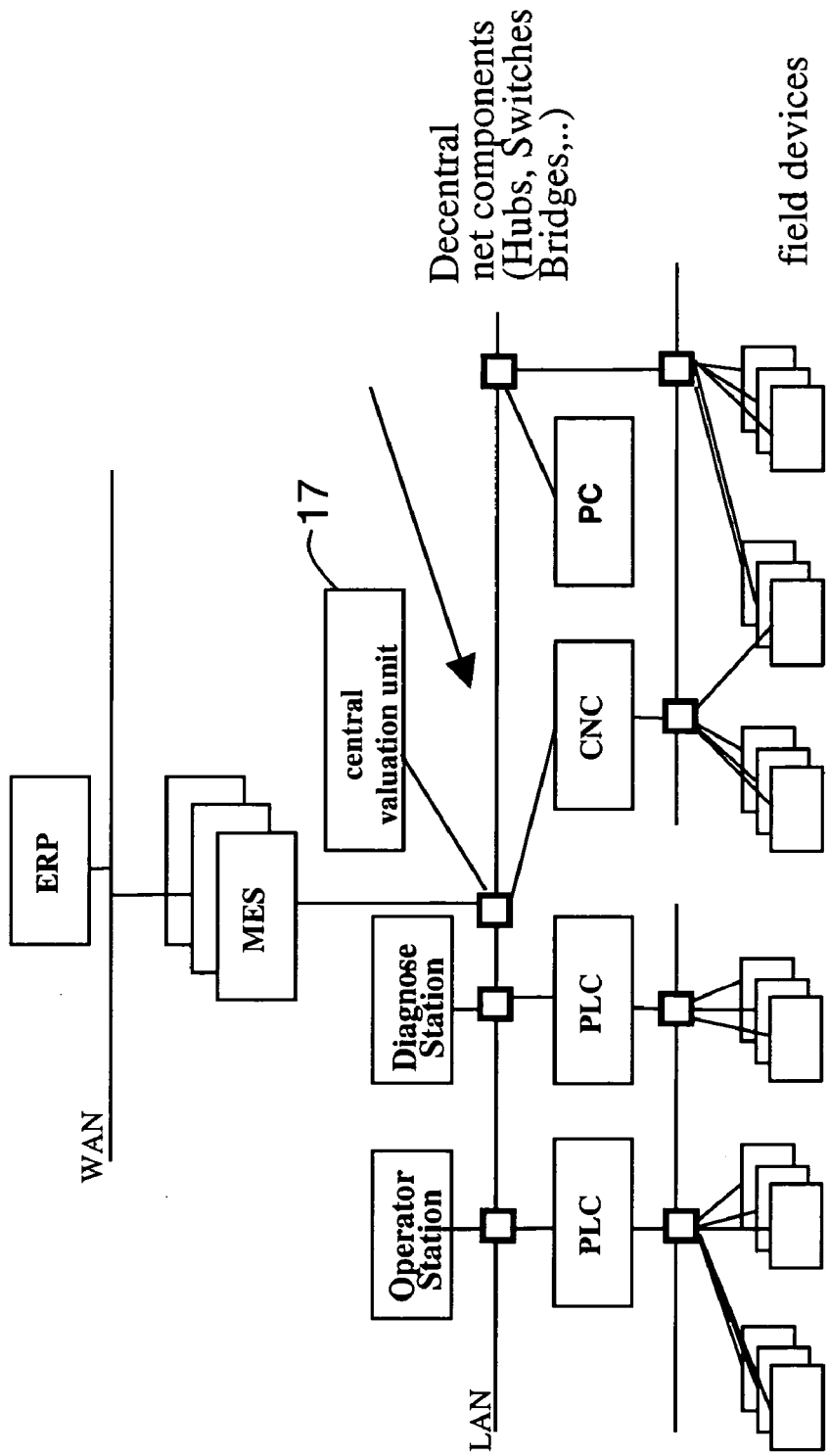
FIG. 6 shows an decentralized embodiment of the present invention.

FIG. 6 shows an decentralized embodiment of the present invention. An ERP system is connected via a WAN (wide area network) with a plurality of MES systems. A MES system comprises decentral net components (e.g. hubs, switches, bridges, peripheral devices) and/or an operator station, a diagnosis station among others which are connected exemplarily via a LAN (local area network). In FIG. 6 also a central evaluation unit 17 is connected to the LAN. The decentral net components and the other stations are typically connected to control units (e.g. Programmable Logic Controls (PLC), Computerized Numerical Controls (CNC), Personal Computers (PC)). The control units are connected to field devices (e.g. pumps, drives). A field device can also be directly connected to a decentral net unit. For example, the field devices can be connected via field bus or Ethernet. Advantageously they are connected via a real-time Ethernet.

The communication means and the peripheral devices used in plants are getting more and more performer and the data existent in these means and devices is getting more and more higher. Therefore the communications means and the peripheral devices collect data, store data and transfer data to a central evaluation unit 17 to predict potential errors. The data transfer can be accomplished on demand of the central evaluation unit 17 (e.g. if the central evaluation unit needs the data to decide if an error is imminent) or the decentral units (e.g. communication means, the peripheral devices) can send the data to the central evaluation unit 17 if they suspect that an error is imminent. Advantageously the communication means and the peripheral devices uses error pattern provided by the central evaluation unit 17 to recognize potential errors.

If a decentral unit recognizes an imminent error, because an error pattern matches to an error, the relevant history data of the involved components will be sent to the central evaluation unit 17. The central evaluation unit 17 analyzes the data with statistical methods and/or data mining methods to decide whether an real error is going to appear or not. The data to be analyzed by the central evaluation unit 17 can be reduced, since the data to be analyzed are confined to the involved components. This confinement of the data to be analyzed can automatically derived from the plant layout, the plant topology, the hierarchical plant model or the automation hierarchy among others. There is a vertical or local data confinement possible (e.g. only the components are taken into account which feed an assembly line with parts) and there is also a horizontal data confinement possible (e.g. a frequency inverter is connected to a special drive or a pump pumps in three dedicated pipes).

Lessens learnt in a part of the plant regarding the prediction of errors can easily transferred or inherited to similar parts or to the same parts in an other area. Using object oriented programming languages (e.g. C++, Java) and/or object oriented mechanisms (class concept, generic classes) this knowledge transfer can easily accomplished.

With the concept of data confinement described above a scaling of the involved components and plant areas can be implemented. Scaling means a successive extension of components or areas but also a successive exclusion of components or areas. Advantageously XML (Extended Markup Language) technologies are used to accomplish a scaling.

Advantageously the Internet or Intranets are used as communication media to connect at least one central evaluation unit 17 with plant components which can be in different locations. Advantageously technologies like Java, HTTP (Hypertext transfer protocol) or HTML (Hypertext Markup Language) can be used to implement the invention to the Internet or Intranet. Using the Internet the plant on the plant operator site, the OEM (original equipment manufacturer), the supplier or the system integrator can easily exchange data regarding errors or maintenance actions and use this information internally.

Figure 7:
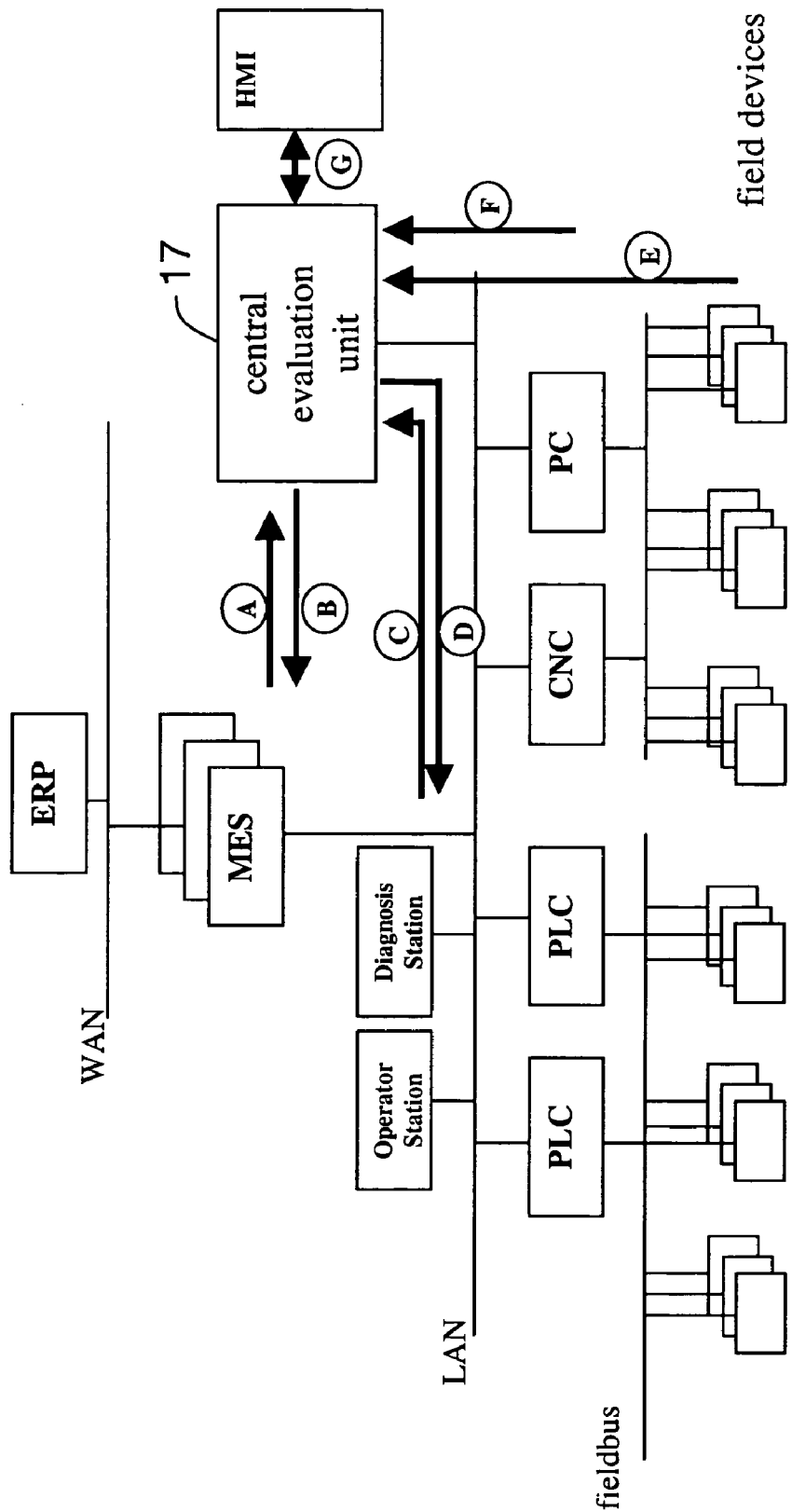
FIG. 7 shows an exemplary information flow in a plant topology, whereby the present invention is used.

FIG. 7 shows an exemplary information flow in a plant topology, whereby the present invention is used. The central evaluation unit 17 can communicate with different plant components. The data flows are depicted as arrows:

A: the central evaluation unit 17 receives from the MES layer especially scheduling data and performance data.

B: the central evaluation unit 17 sends data regarding imminent or acute errors to the MES layer. The MES layer can forward this data to the ERP layer.

C: the diagnosis station sends diagnosis data (e.g. error messages, maintenance data) to the central evaluation unit 17.

D: the central evaluation unit 17 sends predictive error messages and detailed error data to the diagnosis station.

E: from the field devices the central evaluation unit 17 receives measured values, status information, messages among others.

F: from the control units (e.g. PLC, CNC, PC) the central evaluation unit 17 receives alert messages, process mappings among others.

G: the central evaluation unit 17 receives from the HMI (Human Man Interface) data to parameterize and view the predicted error data at the HMI device. The central evaluation unit 17 sends the predicted error data to the HMI.

The operating staff at the HMI can manually trigger measures (stopping of components, maintenance measures) as a response to the predicted error data. But this response data can also be triggered automatically.

A HMI typically comprises output devices (e.g. display, monitor, alert bell, alert light) and input devices (e.g. keyboard. Mouse, touch pad).

The present invention provides advantages to the plant operator: no additional engineering effort to design and install the predictive error system; no additional sensors are necessary (saving money); the derived and acquired data can be used for other plants; the data base regarding the recognition and prediction of errors is continuously growing and the predictions will be more accurate and the dependency from dedicated service or maintenance persons will be reduced; the level of education of the plant operators can be reduced.

The present invention provides also advantages to the OEM: the OEM can use the derived data for his own components; the OEM can sell the knowledge regarding the analysis of errors as a service to third parties; the accumulated knowledge regarding similar components or applications can be sold by the OEM as a product.

The present invention provides the following advantages to the supplier and system integrator: the derived data can be used to improve own products (components, applications); strengthening the position as service and maintenance provider; selling the knowledge regarding the analysis of errors as a service to third parties (e.g. as application service provider).

In addition to the embodiments of the aspects of the present invention described above, those of skill in the art will be able to arrive at a variety of other arrangements and steps which, if not explicitly described in this document, nevertheless embody the principles of the invention and fall within the scope of the appended claims. The present invention can be used for error prediction in different kinds of plants and for different plant components.

What is claimed is:

1. A method for predictive recognition of errors in a manufacturing system, said method comprising the steps of:
archiving a plurality of error patterns that previously occurred in the manufacturing system, the archived error patterns created by statistical methods;
monitoring manufacturing system data in real-time;
maintaining an evaluation unit with input data that defines functional relationships of plant components, on-site relationships of plant components, hierarchical relationships between controllers and field devices, and relationships between enterprise resource planning and manufacturing execution systems, wherein conditions for the manufacturing system data to be monitored are defined in the evaluation unit and submitted to peripheral devices in the manufacturing system based on a hierarchical plant model, plant topology, and automation topology to reduce the amount of the manufacturing system data to be analyzed by the evaluation unit;
comparing the monitored data with the archived error patterns in real-time to predict imminent errors likely to occur in the manufacturing system;
providing recommended actions to prevent the predicted imminent errors; and
refining the plurality of error patterns in an automated learning module that receives indications of relevance in matching of the monitored data to the archived error patterns and receives indications of success of the error predictions and recommended actions, and automatically modifies the archived error patterns to improve the relevance indications and the success indications.

2. A method according to claim 1, wherein information for the archived error patterns is compressed by statistical methods or data mining mechanisms.

3. A method according to claim 1, wherein the comparing of the data is performed by data mining mechanisms.

4. The method according to claim 1, wherein the archived error patterns are automatically built by the monitored data using statistical methods or data mining mechanisms.

5. The method according to claim 1, wherein the monitored data are minimized by vertical or horizontal data confinement using the plant topology.

6. A method according claim 1, further comprising storing the monitored data in a ring-buffer.

7. A method according to claim 1, wherein the monitored data are automatically read out components of the manufacturing system.

8. A method according to claim 1, further comprising triggering corrective actions.

9. A method according to claim 1, wherein the method is adapted for discrete or continuous or batch processes.

10. A method according to claim 1, further comprising:
initially collecting the manufacturing system data in the peripheral devices;
providing selected error patterns from the evaluation unit to the peripheral devices;
recognizing within the peripheral devices potential errors by matching the manufacturing system data collected therein with the selected error patterns provided thereto; and
when a potential error is recognized by any one of the peripheral devices, sending the manufacturing system data collected therein to the evaluation unit.

11. A computerized system for predictive recognition of errors in a manufacturing system, comprising:

a mechanism for archiving a plurality of error patterns that previously occurred in the manufacturing system, the archived error patterns minimized by statistical methods;

an evaluation unit with input data that defines functional relationships of plant components, on-site relationships of plant components, hierarchical relationships between controllers and field devices, and relationships between enterprise resource planning and manufacturing execution systems, wherein conditions for the manufacturing system data to be monitored are defined in the evaluation unit and submitted to peripheral devices in the manufacturing system based on a hierarchical plant model, plant topology, and automation topology to reduce the amount of the manufacturing system data to be analyzed by the evaluation unit;

a mechanism for monitoring manufacturing system data in real-time;

a ring buffer for storing the monitored data;

a mechanism for comparing the monitored data with the archived error patterns in real-time to predict imminent errors likely to occur in the manufacturing system, and for providing recommended action; and an automated learning module that receives indicators of relevance in matching of the monitored data to the archived error patterns, and receives indicators of success of the error predictions and recommended actions, and automatically modifies the archived error patterns to improve the relevance indicators and the success indicators.

12. A system according to claim 11, wherein the comparing of the data is performed by data mining mechanisms.

13. A system according to claim 11, wherein the archived error patterns are automatically built from the monitored data using statistical methods or data mining mechanisms.

14. A device for predictive recognition of errors in a manufacturing system, comprising:

a mechanism for archiving a plurality of error patterns that previously occurred in the manufacturing system, the archived error patterns compressed by statistical methods or data mining methods;

a mechanism for monitoring manufacturing system data in real-time;

a mechanism for storing the monitored data in a ring buffer;

an evaluation unit with input data that defines functional relationships of plant components, on-site relationships of plant components, hierarchical relationships between controllers and field devices, and relationships between enterprise resource planning and manufacturing execution systems, wherein conditions of the manufacturing system data to be monitored are defined in the evaluation unit and submitted to peripheral devices in the manufacturing system based on a hierarchical plant model, plant topology, and automation topology to reduce the amount of the manufacturing system data to be analyzed by the evaluation unit;

a mechanism for comparing the monitored data with the archived error patterns in real-time to predict imminent errors likely to occur in the manufacturing system, and for providing recommended action; and an automated learning module that receives indicators of relevance in matching of the monitored data with the archived error patterns, and receives indicators of success of the error predictions and recommended actions, and automatically modifies the archived error patterns to improve the relevance indicators and the success indicators.

15. A device according to claim 14, wherein the device is a dedicated unit in a manufacturing environment.

16. A device according to claim 14, wherein the device is a decentral net component.

17. A device according to claim 14, wherein the device is a field device.

18. A device according to claim 14, wherein the device is a PLC.

* * * * *